Aug. 9, 1960 J. M. KENDALL 2,948,186
PRECISION MICROMANOMETER
Filed Nov. 14, 1956 3 Sheets-Sheet 1

INVENTOR
J. M. KENDALL
BY
ATTORNEYS

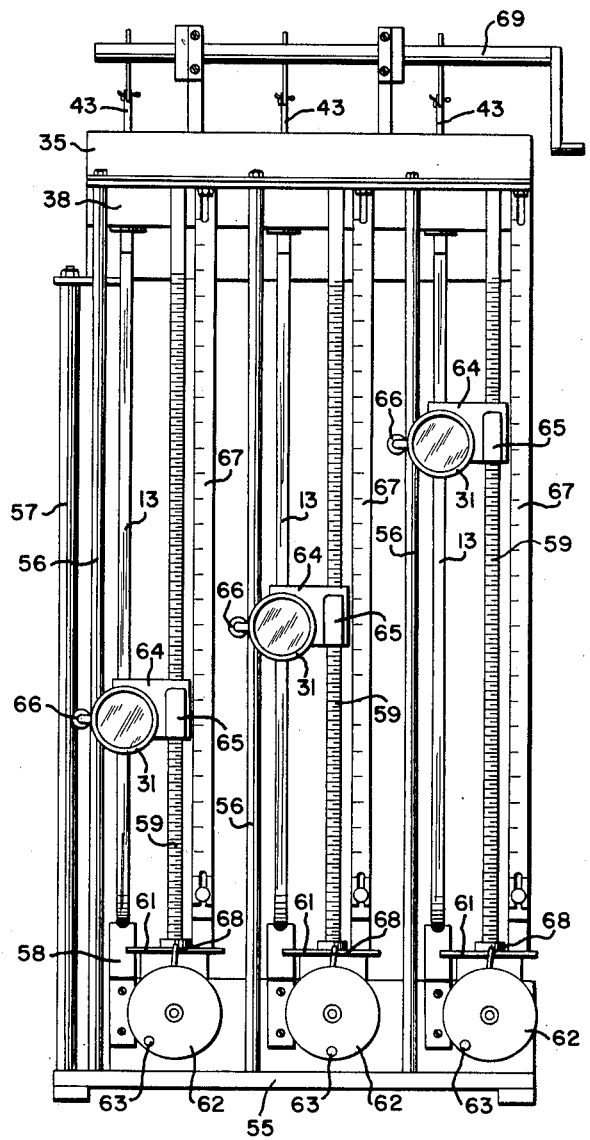

Aug. 9, 1960 J. M. KENDALL 2,948,186
PRECISION MICROMANOMETER
Filed Nov. 14, 1956 3 Sheets-Sheet 3
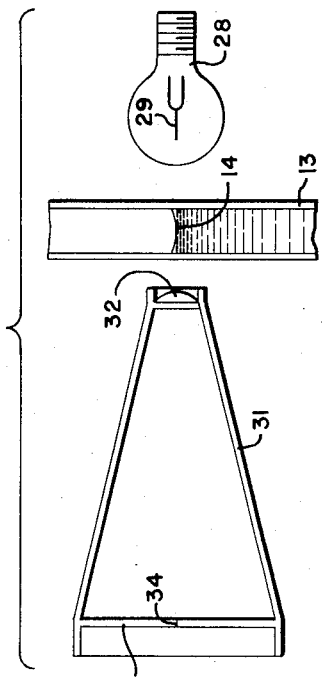
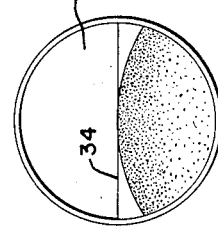
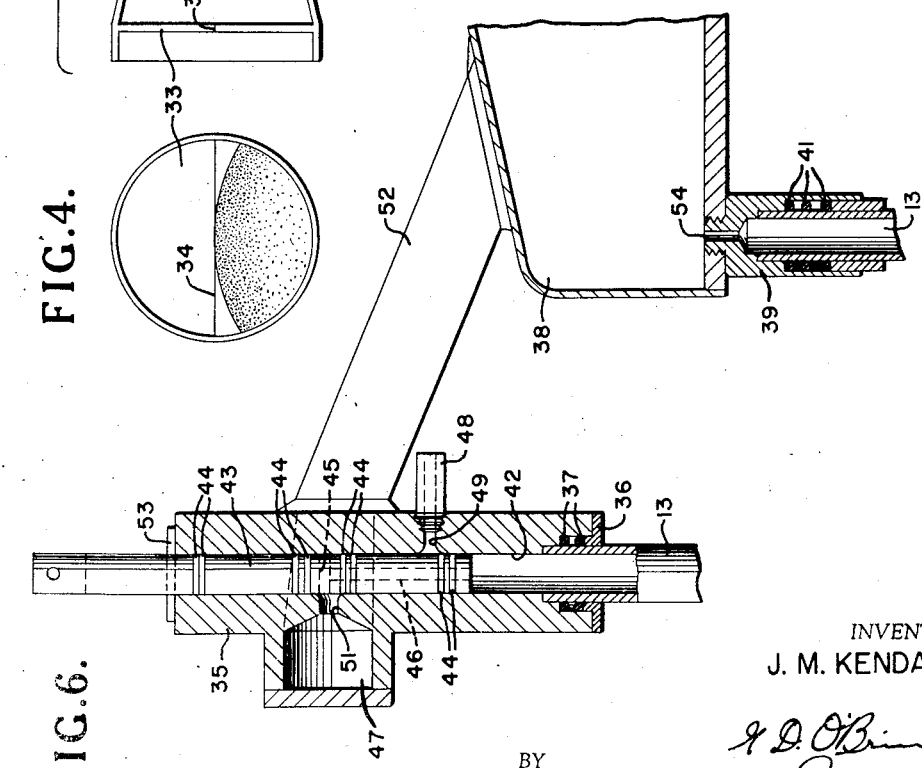
INVENTOR
J. M. KENDALL
BY
ATTORNEYS United States Patent Office 2,948,186
Patented Aug. 9, 1960

2,948,186

PRECISION MICROMANOMETER

James M. Kendall, Coral Hills, Md., assignor to the United States of America as represented by the Secretary of the Navy Filed Nov. 14, 1956, Ser. No. 622,230

9 Claims. (Cl. 88—24)

(Granted under Title 35, U.S. Code (1952), sec. 266)

The invention described herein may be manufactured and used by or for the Government of the United States of America for governmental purposes without the payment of any royalties thereon or therefor.

The present invention relates in general to pressure reading apparatus and more particularly to a precision micromanometer for obtaining precision measurement of small pressures, such, for example, as occur in a supersonic or a hypersonic wind tunnel.

Manometer apparatus of the character mentioned comprises means, such as a manometer tube supporting a column of liquid in combination with means for applying the pressure to be measured to the column which causes a corresponding difference in the level of the liquid column. The level of the liquid column is usually measured by reference to a scale alongside the manometer tube for reading the position of the meniscus of the liquid column. Such a system is not very accurate because of the difficulty of determining the position of the meniscus which has a characteristic shape. Also, immediately after a large sudden change in pressure which causes the meniscus to move to a lower level, a liquid that wets glass does not at once run down the inner surface of the manometer tube. The liquid remaining on the inner surface of the tube causes the meniscus to assume an incorrect position until, after some time, the liquid finally runs down to the liquid colum below the meniscus. In the case of the usual U-tube manometer, this effect seriously affects accuracy and greatly increases the error in a pressure measurement. In addition, inaccuracy stems from the difficulty of ascertaining the lowermost point of the meniscus, which is a curved surface, and limits the use of the manometer apparatus in that precision readings of small pressures cannot be accurately made. Optical systems have been devised for employment in conjunction with manometer apparatus of the type mentioned but have not been found sufficiently accurate to measure the small pressures that occur in supersonic or hypersonic wind tunnels.

The pressure measuring equipment of this invention consists principally of a bank of manometer tubes with necessary valves, a vacuum or pressure reference system, special illumination which collimates, or substantially collimates, light and means for registering the location of the meniscus position.

It is therefore an object of the present invention to provide a new and improved manometer apparatus for precision measurement of small pressures.

Another object is the provision of a manometer apparatus employing collimated, or substantially collimated, light to project an optical image of the curved surface of a meniscus on the screen of a reading or recording apparatus.

A further object is to provide, in a manometer apparatus, a stationary specular reflecting surface which makes possible an extremely sharp optical imaging of the meniscus.

Still another object is the employment of a camera in conjunction with a manometer apparatus to record the positions of the meniscuses.

A still further object is the provision of a vertically adjustable optical system slidable relative to a manometer tube and a vertical scale for reading the position of the meniscus of a liquid column in the tube.

Other objects and many of the attendant advantages of this invention will be readily appreciated as the same becomes better understood by reference to the following detailed description when considered in connection with the accompanying drawings wherein:

Fig. 2 is a front elevational view of another embodiment of the invention;

Fig. 3 is a schematic side view of the principal parts of the embodiment of Fig. 2;

Fig. 4 is a view of the image seen on the ground glass screen of the eyepiece of the embodiment of Fig. 2;

Fig. 5 is a view showing the paths of rays of light in the vicinity of the curved surface of the meniscus; and Fig. 6 is a fragmentary detail view in section of the valve system housing and shows the connections of the ends of a manometer tube to the housing and to a tank associated therewith.

Figure 1:
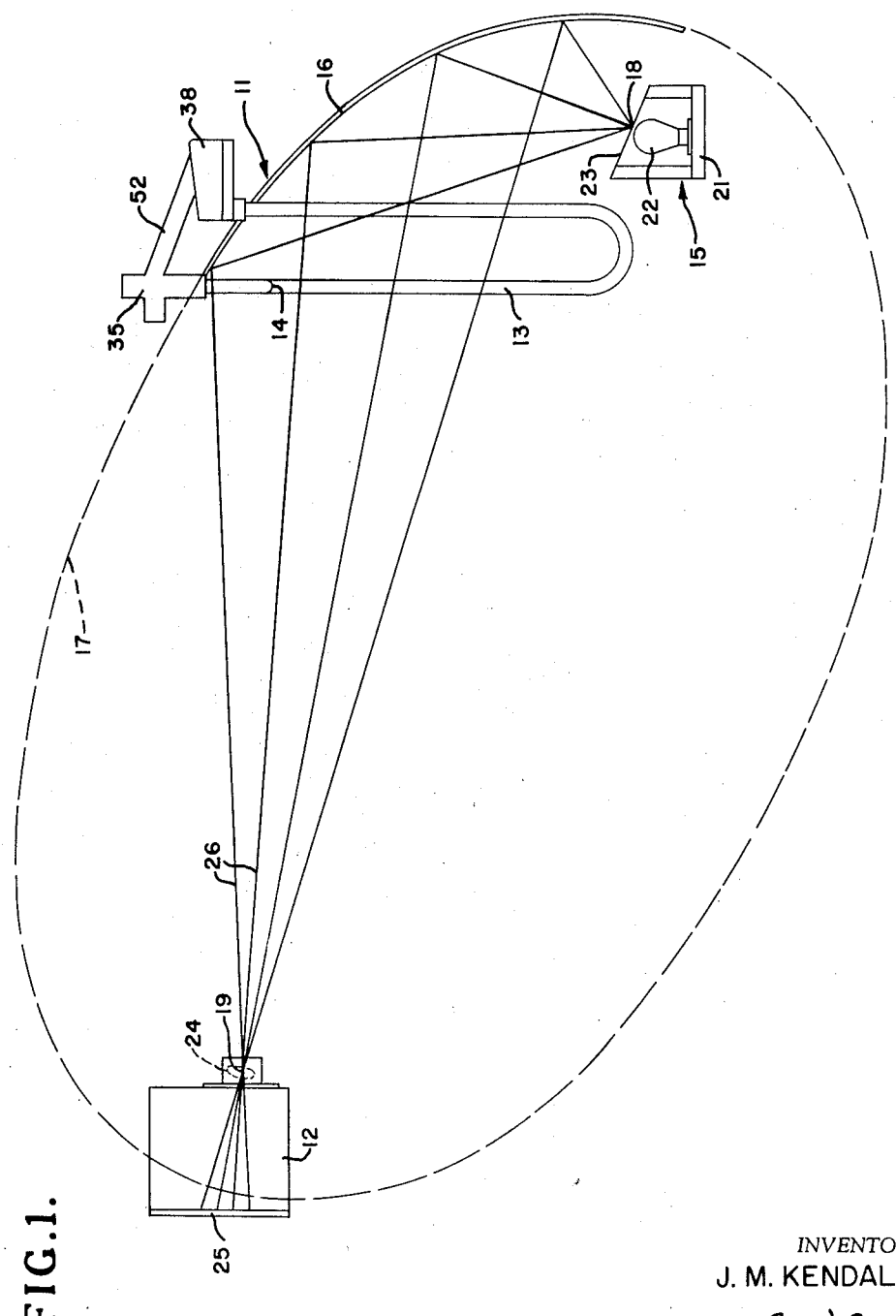
Fig. 1 is a schematic view of one embodiment of the invention.

Referring now to the drawings, wherein like reference characters designate like or corresponding parts throughout the several views, there is shown in Fig. 1, which illustrates a preferred embodiment, an arrangement for measuring pressures comprising a manometer apparatus, designated generally by reference numeral 11, and a reading or recording apparatus such as a camera 12. The manometer apparatus comprises a bank of tubes 13, each tube containing a column of liquid having the usual meniscus 14 at the top thereof, the tubes being illuminated by a light source 15 and a reflecting means or metal mirror 16 which directs the light past the meniscuses and toward the reading or recording apparatus.

From an inspection of Fig. 1, it will be noted that the reflecting means 16 forms part of an ellipse 17, the light source 15 being substantially a straight-line source of light; an exact line source of light being desirable but not necessary. The approximate line source of light 15 is adequate for the purpose and is located behind the tubes and on one focal axis 18 of the ellipse, the reading or recording apparatus being located at the other focal axis 19 of the ellipse and centrally spaced with respect to the bank of tubes. The reflecting means 16 consists, preferably, of a sheet of polished stainless steel curved to the elliptical shape and suitably supported in position behind the manometer tubes, as shown in Fig. 1, with the focal axes of the elliptical reflector disposed horizontally. The light source 15 comprises a box 21 whose length is equal to the total width of the bank of tubes and contains a row of light bulbs 22 spaced a few inches apart; sixty watt light bulbs spaced four inches apart have been found to be satisfactory. Over the top of the box is a narrow strip of tracing paper 23 which serves to give a uniformly illuminated surface that is long and narrow. This surface, of course, is not exactly a line source of illumination, but it has been found that it approximates a line source sufficiently well to give good clear meniscus images. A blower (not shown) may be provided at one end of the box to dissipate the heat of the light bulbs which otherwise might scorch the paper. If desired, a fluorescent light bulb of sufficient length could be used in place of the row of bulbs 22 and paper 23. As will be appreciated from viewing Fig. 1, the approximate line source of illumination is located substantially on the focal axis 18 of the ellipse between the manometer tubes 13 and the elliptical reflector 16.

The reading or recording apparatus, in this case, consists of the camera 12, the camera having a lens 24 which is located at the other focal axis 19 of the ellipse. As viewed from the camera, the polished metal reflector 16 provides a uniform source of specularly reflected light, which is substantially collimated in the vertical direction, over the entire area behind the manometer tubes. The camera back is provided with a ground glass viewing screen 25 and also has the usual means for receiving cut film holders which are inserted in the camera just before taking a picture; the lens and film being disposed in vertical planes parallel to the plane of the manometer tubes. So arranged, rays of light 26 from the light source are reflected past the manometer tubes through the lens at focus 19 and the images of the meniscuses are sharply recorded on the film with their positions in exact proportion to the actual positions of the meniscuses in the manometer tubes.

For the sake of accuracy, reference lines at known heights may be established and the positions of the meniscuses referred to the nearest line. These lines, if desired, may take the form of horizontal wires vertically spaced and located for calibration purposes about one-half inch in front of the manometer tubes. The parallax which results from this arrangement may be calculated and allowed for in computing the overall scale factors used in reading the negatives. It is possible, therefore, to scale the negatives or prints and obtain accurate data therefrom.

As will be noted from an inspection of Fig. 1, the lens 24 of the camera has its axis disposed a little below the center of the camera because generally the meniscuses are positioned below such axis. Furthermore, the camera is mounted with the lens axis substantially normal to the upper portion of the central manometer tubes. This is for the reason small low pressures position the meniscuses in the upper portion of the tube and the rays of light in the vicinity of such a meniscus deviate but slightly in the vertical direction from the lens axis and the error is small. At the higher pressures, with the meniscus positioned in the mid-portion of the tube, the deviation is somewhat greater but when considered as a percentage of the higher pressure the error is still small.

One of the most usual methods of illuminating manometer tubes in a bank for reading the meniscus positions thereof is to place tracing paper immediately behind the tubes and locate lamps behind the paper. This arrangement diffuses the light, thereby providing very uniform illumination which is easy on the eyes and satisfactory for approximate readings of meniscus positions when an opaque or a colored transparent fluid is used in the tubes, the contrast between the fluid and the diffused light being sufficient to show approximately the top of the column. If, however, a meniscus so illuminated is examined with an optical system, such as a telescope, it has been found that it is very difficult, due to the diffused light permitting, at best, the projection of a fuzzy image of the meniscus, to determine exactly where the meniscus is, or even to find some characteristic feature in the appearance of the meniscus which will serve as a marker to obtain an accurate reading of the meniscus position.

As a result of the present invention, it has been determined that if the meniscus is illuminated with light that is collimated, or substantially so, in the vertical direction, instead of with diffused light provided by tracing paper and rear lighting, the position of the meniscus can be read or ascertained with great accuracy. The light, substantially collimated in a vertical direction, may be furnished by direct light from a point or horizontal line filament or by light that is specularly reflected by an elliptical metal mirror and emanates from a horizontal line source that is substantially on one focal axis of the mirror. The surface of the meniscus of a column of liquid is curved and, in the case of a wetting liquid, the lowest point on the surface is on the axis of a vertically disposed manometer tube containing the liquid.

Substantially collimated light, whether direct or specularly reflected, as hereinbefore described, passes through a transparent liquid when a ray of such light is tangent to the aforesaid lowest point or the rays are below such tangent ray, rays of light impinging upon the curved surface of the meniscus above the tangent ray being reflected downwardly through the liquid in the tube. This may be better understood by reference to Fig. 5 in which rays of light 26 have been indicated as being approximately parallel as they approach the meniscus, the rays reflected downwardly by the curved surface of the meniscus being indicated by numeral 27. The sudden change from full illumination just below the meniscus, to no illumination at the bottom surface of the meniscus, serves as a very good line of demarcation for determining the position of the meniscus and such an arrangement has been employed in the manometer apparatus of the present invention. It is not necessary that the illumination for the tubes be collimated in both directions; in the horizontal direction the light can be diffused and will not adversely effect the appearance of the meniscus provided, of course, that the light is substantially collimated in the vertical direction.

The system of Fig. 1, hereinbefore described, is used in the case where a bank of manometer tubes must be illuminated and read. If only one meniscus is to be illuminated and read, the line source of light may be provided through the medium of an electric light bulb having a point filament or a straight line filament which is horizontally disposed. Of course, such a light source must be capable of being moved vertically by external means to position it properly with respect to the position of the meniscus. This may be done by attaching the light bulb to an optical system which projects an image of the meniscus on a screen. Fig. 3 schematically illustrates the general arrangement of such an optical system for reading a meniscus position, the light being furnished by a light bulb 28 having a straight line filament 29 horizontally disposed and an optical system 31 comprising a lens 32 which projects a magnified image of the meniscus upon a ground glass screen 33, the screen being provided with a horizontal crosshair or fiducial mark 34. The filament and crosshair are on the axis of the lens and the optical system is capable of being adjusted vertically by suitable means until the image of the meniscus is positioned tangent to the crosshair or fiducial mark on the ground glass screen and appears as shown in Fig. 4; it being appreciated that the optical system employed inverts the image of the meniscus.

For the measurement of very low pressures, down to 1 mm. of mercury and less, it is necessary to use a liquid having a very low vapor pressure at room temperature in the manometer tubes, such as dibutylphthalate, dibromoethylbenzene, acetylene tetrabromide, silicone oil or mercury.

When mercury is used, with its characteristic convex-upward meniscus, the rays reflected by the surface of the meniscus are reflected upwardly, the reverse of rays 27 in Fig. 5, and the image of such a meniscus would appear inverted with respect to the crosshair 34 in Fig. 4.

Turning now to a more detailed description of the manometer apparatus of Fig. 1, it will be noted that the manometer tube 13 is shown as being U-shaped, one of the vertical legs of the tube being connected to a valve system housing 35 by coupling means 36, Fig. 6, including O-ring seals 37, the other leg being connected to a tank 38 by coupling means 39 including O-ring seals 41. The valve system housing is provided with a series of cylindrical openings 42 in each of which a valve plunger 43, having O-ring seals 44 thereon, is adapted to operate, the plunger being provided with a cross axial bore 45 and a longitudinal bore 46 intersecting the cross axial bore and extending through the lower end of the plunger, Fig. 6. The housing 35 is also provided with a reference vacuum or pressure chamber 47 and nipples 48 for connection of pressure-conducting tubes adapted to be coupled to a model in a wind tunnel; there being a nipple 48 associated with each opening 42 and in communication therewith by way of a port 49. Each plunger 43 is adapted to be positioned so that the cross axial bore 45 thereof is in communication with a port 51 leading to the reference vacuum or pressure chamber in one position of the plunger or with the cross axial bore 45 in communication with port 49 in another position of the plunger. A conduit 52 provides communication between the tank and the reference vacuum or pressure chamber.

When the valve plungers are positioned so that the cross axial bores 45 thereof are in communication with ports 51 leading to the reference vacuum or pressure chamber 47, the columns of liquid in the tubes are subjected to the pressure of the reference vacuum or pressure. This is the position of the valve plungers when the manometer apparatus is not in use and the plungers may be held disposed in such position by a pin or rod 53 associated with each plunger and engaging housing 35.

In the operation of the apparatus of Fig. 1 to ascertain the values of the pressures on the model in the wind tunnel, the valve plungers are positioned so that the cross axial bores thereof are in communication with ports 49 leading to nipples 48 which are connected to pressure-conducting tubes interconnecting the model and the valve system housing. The liquid columns in the manometer tubes are thus subjected to the pressures transmitted through the nipples and, after pressure conditions have stabilized, a photograph of the meniscus positions is taken. To damp oscillations of the liquid columns and to reduce wave motion in the tank, the coupling means 39 connecting the manometer tubes to the tank are each formed with a restricted opening or damping orifice 54 and, additionally, the tank may have suitable baffles (not shown) therein.

In Fig. 2, there is shown an apparatus embodying a form of the invention in which each of the manometer tubes 13 is provided with a vertically adjustable optical system 31 and a light source, such as a light bulb, movable therewith, the light source not being shown in the figure because it is behind the optical system but its relation thereto may be appreciated by reference to Fig. 3. Such apparatus comprises a base 55 and a plurality of front support elements or rods 56 and a plurality of rear support columns 57 extending upwardly from the base and supporting at the upper ends thereof a valve system housing 35 and a tank 38, the tank and housing being connected with each other and with each of the manometer tubes and a wind tunnel model in the manner shown in Fig. 6. For additional support each of the manometer tubes rests on a mount 58 individual thereto, the mounts being secured to the base 55.

Associated with each of the manometer tubes, and disposed parallel thereto, is a screw-threaded rod 59 which is journalled for rotation and carries a circular scale 61 at the lower end thereof and rotatable therewith, the screw threaded rod being suitably geared to be rotated by turning a hand wheel 62 having a handle 63.

The optical system 31 and the light source associated therewith are carried by a movable carriage 64 which is connected to the screw-threaded rod by means including a conventional spring-pressed split-nut throwout mechanism 65, whereby rotation of the screw-threaded rod moves the carriage vertically, yet the carriage may be disconnected from said rod and moved by hand to any point on the rod. Only one end of the carriage is supported on the screw-threaded rod, the other end of the carriage having attached thereto a system of rollers 66 engaging an adjacent support rod 56, thereby slidably supporting said end of the carriage and steadying the same.

A vertical linear scale 67 is mounted alongside the screw-threaded rod in parallel relation thereto, and a pointer 68 is provided for the circular scale 61.

For simultaneous operation of the valve plungers 43, a rockshaft 69 is supported on the housing 35 and is suitably linked to the plungers, whereby rocking the rockshaft positions the plungers as desired.

In operation, with the plungers positioned so the liquid columns in the manometer tubes are subjected to the pressures transmitted from the model and after pressure conditions have stabilized, use is made of the split-nut throwout mechanism to disconnect the carriage from the screw-threaded rod and position the optical system and associated light source approximately on line with the meniscus after which the split-nut throwout mechanism is released to connect the carriage to the screw-threaded rod. The screw-threaded rod is then rotated by means of the hand wheel associated therewith until the image of the meniscus is brought into proper registration with the crosshair or fiducial mark 34 on the ground glass screen 33 of the optical system, Figs. 3 and 4, use being made of the linear scale and the circular scale to obtain a precise measurement of the height of the meniscus of the liquid column.

Although tube 13 has been described as being U-shaped, it will be appreciated that a straight glass tube could be employed instead, the upper end of the glass tube being connected to the housing 35 by suitable coupling means, such as means 36, the lower end of the tube being in communication by way of a metal pipe or the like with the tank 38, the pipe being disposed to one side of the glass tube so as not to be in the way of light reflected from reflector 16 towards the glass tube.

While different means have been disclosed for obtaining precision measurements of pressures, it should be understood, of course, that the foregoing disclosure relates only to preferred embodiments of the invention and that numerous modifications or alterations may be made therein without departing from the spirit and the scope of the invention.

What is claimed as new and desired to be secured by Letters Patent of the United States is:

1. A precision manometer for precision measurement of meniscus heights comprising, in combination, a vertically disposed transparent manometer tube containing a liquid column with a meniscus, an elliptical reflector immovably arranged adjacent said tube with the focal axes on opposite sides thereof, a source of light immovably located behind the tube at one of said axes providing illumination of the meniscus by light that is substantially collimated in a vertical direction, and an optical system including lens means in front of the tube at the other of said axes for reading the height of the meniscus.

2. A precision manometer for precision measurement of meniscus height, comprising, in combination, a vertically disposed transparent manometer tube containing a pressure fluid column with a meniscus, an optical system for photographing the height of the meniscus and including an elliptical reflector immovably located behind the tube, a source of light on one focal axis of said reflector and providing illumination of the meniscus with an immovable light that is substantially collimated in a vertical direction, and a camera facing the tube and having a lens on the other focal axis of the reflector in such manner that said meniscus as viewed by the camera is equally illuminated regardless of the height thereof.

3. A precision manometer according to claim 2, in which the source of light is a substantially straight line source of light and includes a row of electric light bulbs disposed in a horizontal straight line and having incandescent filaments disposed along a line approximately on said one focal axis of the elliptical reflector.

4. A manometer according to claim 3, in which the line of electric light bulbs is housed in a long narrow box having a long narrow aperture therein aligned with said bulbs and which is covered with tracing paper, the light from the incandescent filaments passing through said tracing paper and toward the reflector.

5. A manometer according to claim 2, in which said lens has its axis disposed below the center of the camera.

6. A manometer according to claim 2, in which said camera is mounted with the axis of said lens disposed substantially normal to the upper portion of said tube.

7. A manometer device for measuring pressures at a plurality of different points within a wind tunnel comprising a plurality of transparent manometer tubes corresponding in number to the number of points at which the pressures are to be measured, said manometer tubes each containing a column of liquid and being arranged vertically in a plane, means including a plurality of normally closed ducts for establishing fluid communication between each of said tubes and said points respectively when the ducts are open, means including a plurality of ganged valve plungers for simultaneously opening at will said ducts thereby to establish fluid communication between the interior of said wind tunnel at said points and said manometer tubes, an elliptical reflector immovably disposed adjacent said manometer tubes and characterized by two elongated parallel focal axes, each of said axes being disposed horizontally and parallel respectively to the plane of said manometer tubes, an elongated source of artificial light immovably arranged in coincidence with one of said axes for illuminating the meniscuses of the liquid in said manometer tubes by light rays reflected from said reflector and substantially collimated in a vertical direction thereby, and a plurality of cameras longitudinally disposed with the lens thereof in coincidence with the other one of said axes in such manner that the meniscuses of all of said columns of liquid as viewed by the cameras are equally illuminated regardless of the height thereof within the tubes when said ducts are open and the wind tunnel is operating whereby a high precision photographic record is made of the height of said meniscuses correlative to said pressures respectively.

8. A manometer device for measuring and permanently recording relative pressures at a plurality of different points within a wind tunnel comprising a camera having film therein, a plurality of manometer tubes having liquid therein and connected to said wind tunnel at different points, valve means for simultaneously subjecting all the manometer tubes to the pressures in said wind tunnel, standard pressure means connected to said manometer for providing a standard reference, an elliptical reflector having a first and second focal axis immovably disposed adjacent said manometer tubes, an elongated light means immovably located at said first focal axis for collimating the light to said reflector where it is reflected through the manometer tubes to said camera, said camera being located at said second focal axis whereby the location of the meniscus of said liquid showing the relative pressure on each of said manometer tubes is permanently recorded by said film.

9. A manometer device for measuring and permanently recording relative pressures at a plurality of different points within a wind tunnel comprising a plurality of transparent manometer tubes each containing a column of liquid, means including a valve for simultaneously subjecting the interior of each of the manometer tubes to a pressure in the wind tunnel, standard pressure means connected to said manometer tubes for providing a standard reference pressure therein, an elliptical reflector immovably disposed adjacent to said manometer tubes having two focal axes, a substantially straight line source of light including a row of electric light bulbs immovably disposed adjacent said manometer tubes, in a straight line, said light source being located approximately on one of the focal axes of said reflector, said light source being substantially collimated and reflected through said manometer tubes by said reflector, a camera with film means for permanently recording the location of said meniscus, said camera being located at the other focal axis of said reflector and located such that the meniscus as viewed by the camera is equally illuminated regardless of the height thereof.

References Cited in the file of this patent

UNITED STATES PATENTS

| | | |
|---|---|---|
| 1,068,370 | Simpson | July 22, 1913 |
| 1,283,084 | Cole | Oct. 29, 1918 |
| 1,763,630 | Hopkins | June 10, 1930 |
| 1,839,893 | Pierce | Jan. 5, 1932 |
| 2,154,842 | Glenn | Apr. 18, 1939 |
| 2,496,447 | Dresser | Feb. 7, 1950 |
| 2,596,271 | Mondet | May 13, 1952 |
| 2,819,649 | McLeod et al. | Jan. 14, 1956 |

OTHER REFERENCES

"A Precision Differential Manometer," Maslach, The Review of Scientific Instruments, vol. 23, No. 7, July 1952, pages 367–369.